United States Patent [19]

Farrey

[11] Patent Number: 4,496,081

[45] Date of Patent: Jan. 29, 1985

[54] DISPENSING APPARATUS

[75] Inventor: Merlyn F. Farrey, Akron, Ohio

[73] Assignee: Fomo Products, Inc., Akron, Ohio

[21] Appl. No.: 512,029

[22] Filed: Jul. 8, 1983

[51] Int. Cl.³ .............................................. B67D 5/60
[52] U.S. Cl. .................................... 222/135; 137/607; 239/414; 239/304; 222/145; 222/180; 222/402.14; 222/529
[58] Field of Search ....................... 239/414, 304, 306; 222/134–137, 145, 529, 173, 180, 3, 402.1, 402.14; 137/607, 866

[56] References Cited

U.S. PATENT DOCUMENTS

| | | | |
|---|---|---|---|
| 2,864,534 | 12/1958 | Wrenn | 222/173 |
| 3,161,322 | 12/1964 | Stone | 222/145 |
| 3,236,418 | 2/1966 | Dalle et al. | 222/145 |
| 3,246,849 | 4/1966 | Aske | 239/304 |
| 3,613,956 | 10/1971 | McCulloch | 222/145 |
| 3,620,414 | 11/1971 | Phillips | 222/145 |
| 4,278,188 | 7/1981 | Stephenson et al. | 222/402.14 |

FOREIGN PATENT DOCUMENTS 22014 12/1901 United Kingdom ................ 137/866

Primary Examiner—H. Grant Skaggs
Attorney, Agent, or Firm—Mack D. Cook, II

[57] ABSTRACT

A dispensing apparatus to deliver at point-of-use chemically reactive constituents or foam reactants in a predetermined volumetric ratio. The foam reactants are prepackaged within replaceable pressurized containers carried by the apparatus and having projecting dispensing valves connected to a manually actuated dispensing nozzle through flexible tubing. The apparatus includes brackets for holding the top and base of the containers in side-by-side fixed relation, a T-shaped member for actuating the dispensing valves in unison, and a manual key with an elongated shank extending through bores in the brackets and the T-shaped member. The key shank and the bores are selectively threaded to provide opening or closing movement of the container dispensing valves.

4 Claims, 5 Drawing Figures

DISPENSING APPARATUS

BACKGROUND OF THE INVENTION

Dispensing apparatus for reactive constituents to produce urethane foam and the like are known in the prior art.

U.S. Pat. No. 3,633,795, 1/1972, Brooks discloses a portable dispenser apparatus connected by lengths of tubing to a pair of pressurized containers. The dispenser comprises a manually graspable support bracket, a pair of tiltable valve elements, a valve supporting assembly and a dispensing nozzle. The valve supporting assembly attaches the dispensing valve to the bracket and includes a housing portion and a pair of rearwardly extending inlet members for connecting to the tubing. The bracket has a trigger which actuates the tiltable valve elements in unison.

U.S. Pat. No. 3,784,110, 1/1974, Brooks discloses a foam dispensing gun with a housing, a handle affixed to the housing, dual valves for controlling the flow of foam components through the gun, tubing lengths between valves and supply containers, and a manually operable trigger on the housing for controlling the valves. A removable dispensing nozzle, secured by a latch within the housing, is structured so that all the fluid component mixing activity is confined to the nozzle means interior.

U.S. Pat. No. 4,311,254, 1/1982, Harding is an improvement over Brooks II in providing improved elements for mounting and holding a disposable nozzle.

A dispensing apparatus according to the invention is primarily intended for use in the industrial or commercial installation or application of urethane foam, with the reactants or constituents being supplied from pressurized cylindrical body containers having a projecting dispensing valve in the top end thereof. (For best operation, the containers are inverted, valve down, during use of the apparatus.) Primary components of the apparatus are fabricated from engineered state-of-the-art plastics, providing for reliability of operation and lower cost. At the end of a work day or upon completion of an insulation project, the apparatus may be either discarded or cleaned for reuse.

SUMMARY OF THE INVENTION

The object of the invention is to provide an improved dispensing apparatus, portable and relatively light in weight, to precisely and safely deliver at point-of-use chemically reactive constituents or foam reactants in a predetermined volumetric ratio.

A further object of the invention is to provide a dispensing apparatus for two component polyurethane foam. The two foam components are pre-packaged in pressurized and valved dual containers. The formulation may also include surfactants to stabilize the emulsion, blowing agents, fire retardants and catalysts.

Still further, it is an object of the invention to provide a dispensing apparatus which may be mass-produced using engineered state-of-the-art plastics and commercially available and economical molding processes; a dispensing apparatus which is capable of reuse when cleaned, but of such low cost as to be disposable after use.

These and other objects of the invention and further advantage thereof, will be apparent in view of the detailed description and drawings.

An apparatus according to the invention is used for dispensing multi-component foam reactants in two pressurized containers. Each container includes a projecting dispensing valve in the top end thereof. In general, a dispensing apparatus has two parallel brackets for holding the top ends and the base ends of the two containers in a side-by-side fixed position. Each bracket has a medial bore therethrough. A T-shaped member having a projecting medial sleeve with a bore therethrough has laterally extending rigid side bars for engagement with the container valves. A length of flexible tubing is connected to a container valve and extends from a rigid side bar to a dispensing nozzle. A manual means controls the flow of foam reactants through the lengths of flexible tubing when the container valves are open. A manual key having an elongated shank extends coaxially within the bracket medial bores and the T-shaped member sleeve bore. Thread means having an internal component on the key shank and an external component in either a bracket bore or a sleeve bore function so that manual rotation of the key will move the T-shaped member toward one of the brackets to open the container valves in unison.

THE DRAWINGS

DETAILED DESCRIPTION OF THE INVENTION

Figure 1:
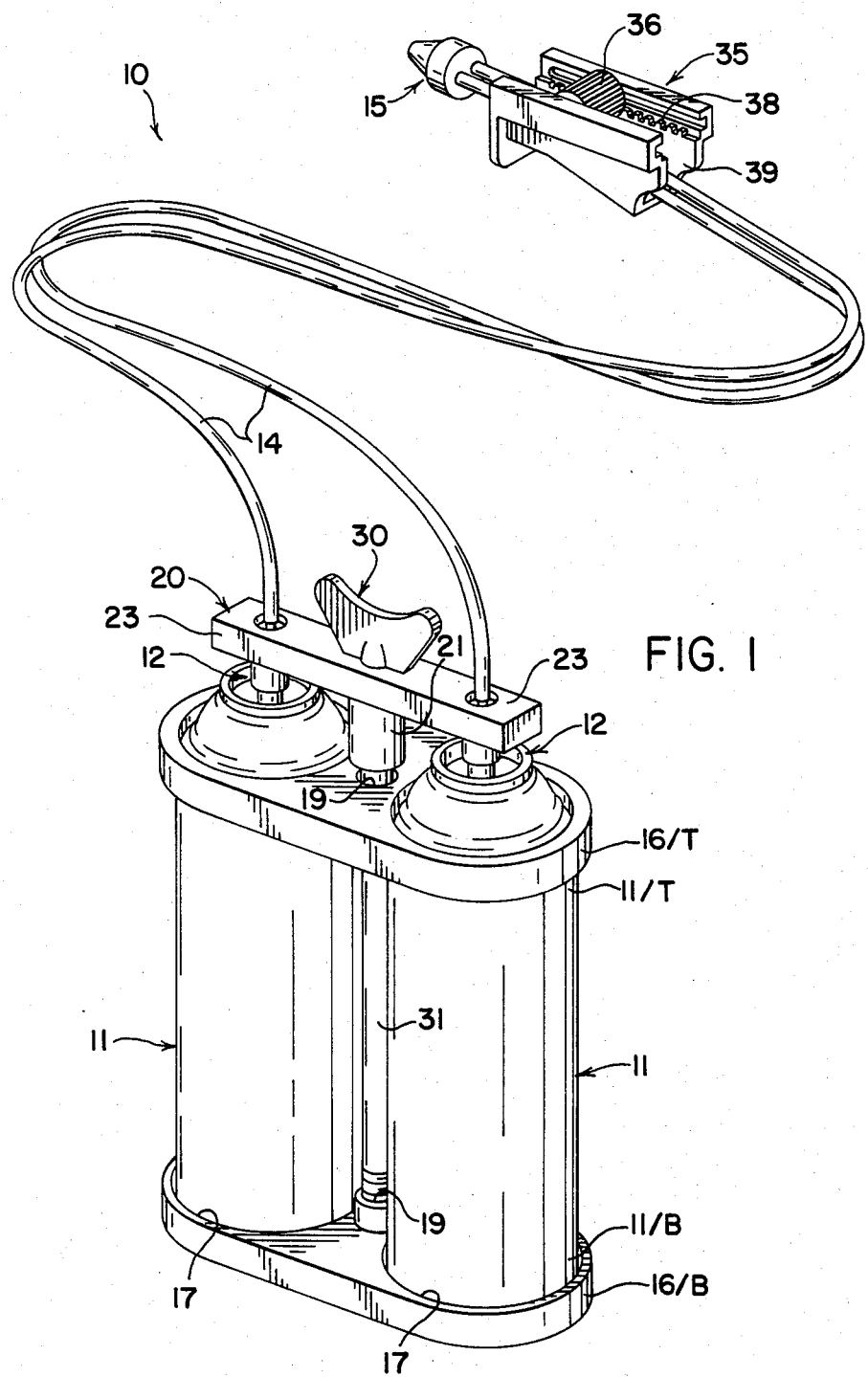
FIG. 1 is a perspective view of a first embodiment of a dispensing apparatus according to the invention.

A dispensing apparatus according to the invention is referred to generally by the numeral 10. Two pre-packaged pressurized containers of foam reactants are referred to generally by the numeral 11. Each container 11 has a projecting dispensing valve referred to generally by the numeral 12. Each container valve 12 is connected to the supply end of a length of flexible tubing 14. The delivery end of each tubing 14 is connected to a dispensing nozzle referred to generally by the numeral 15.

The apparatus 10 includes two parallel brackets, 16/T and 16/B, for holding the top end and bottom end, 11/T and 11/B, of the containers 11 in a side-by-side fixed position. As shown, each bracket 16 has two circular flanges 17 for frictional and secure engagement with holding rings, 18/T and 18/B, on a container 11. Between the flanges 17, each bracket 16 has a medial bore 19 therethrough.

The apparatus 10 further includes a T-shaped member referred to generally by the numeral 20 having a projecting sleeve 21 with a bore 22 therethrough. A sleeve 21 may have a predetermined length so that movement thereof toward a bracket 16/T, as hereinafter described, will be positively stopped. A member 20 also has laterally extending rigid side bars 23 for actuation of the container valves 12.

Figure 4:
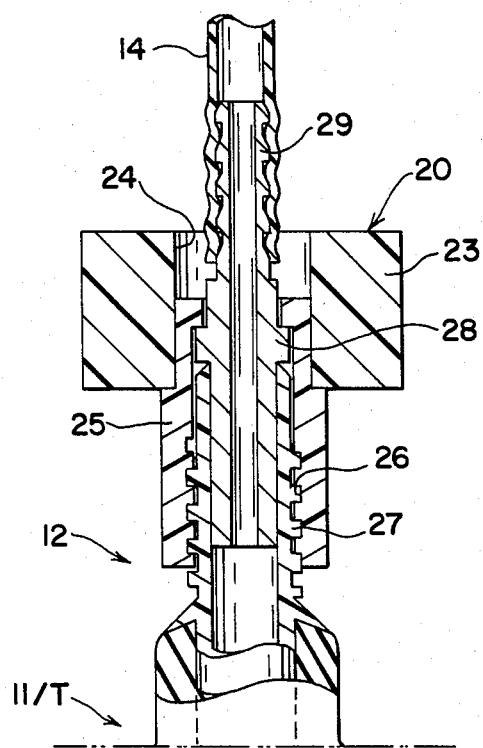
FIG. 4 is an enlarged view of a projecting container dispensing valve, taken substantially as indicated on line 4—4 of FIG. 2.

As best shown in FIG. 4, each valve actuating bar 23 has a vertical bore 24 to receive and carry a valve actuating collar 25. A collar 25 is attached, as by complementary threads 26, to the housing 27 of a container valve 12. A valve housing 27 encloses a stem 28 terminating in a fitting 29 for connection to the supply end of a length of flexible tubing 14.

The apparatus 11 still further includes a manual key referred to generally by the numeral 30 having an elongated shank 31. The key shank 31 extends coaxially within the medial bracket bores 19 and the sleeve bore 22.

Figure 2:
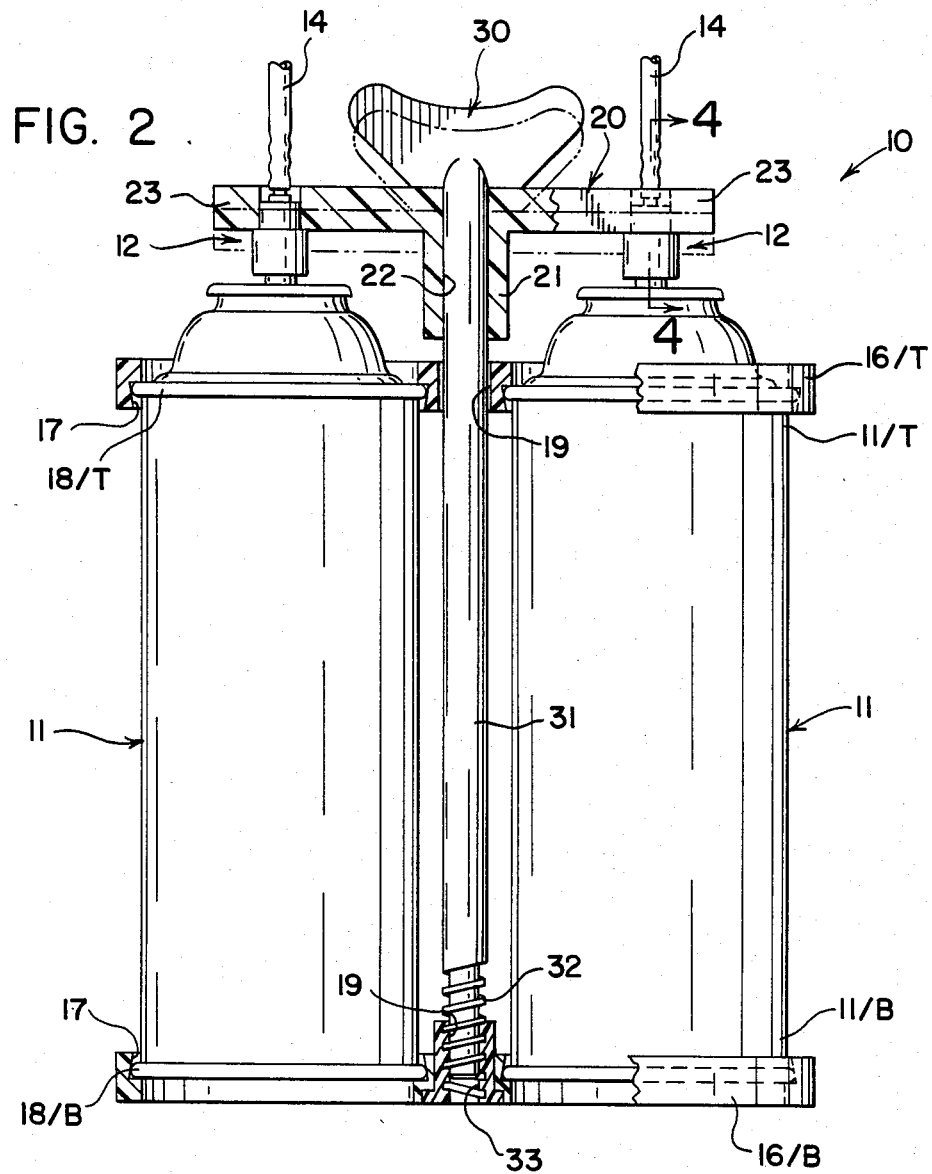
FIG. 2 is an elevation, partly in section, of the embodiment of FIG. 1.

In the embodiment as shown in FIGS. 1 and 2, the manual key 30 is positioned adjacent the T-shaped member 20. The end of key shank 31 has a thread 32. The thread 32 is complementary with a thread 33 in the medial bore 19 of a bracket 16/B.

Figure 3:
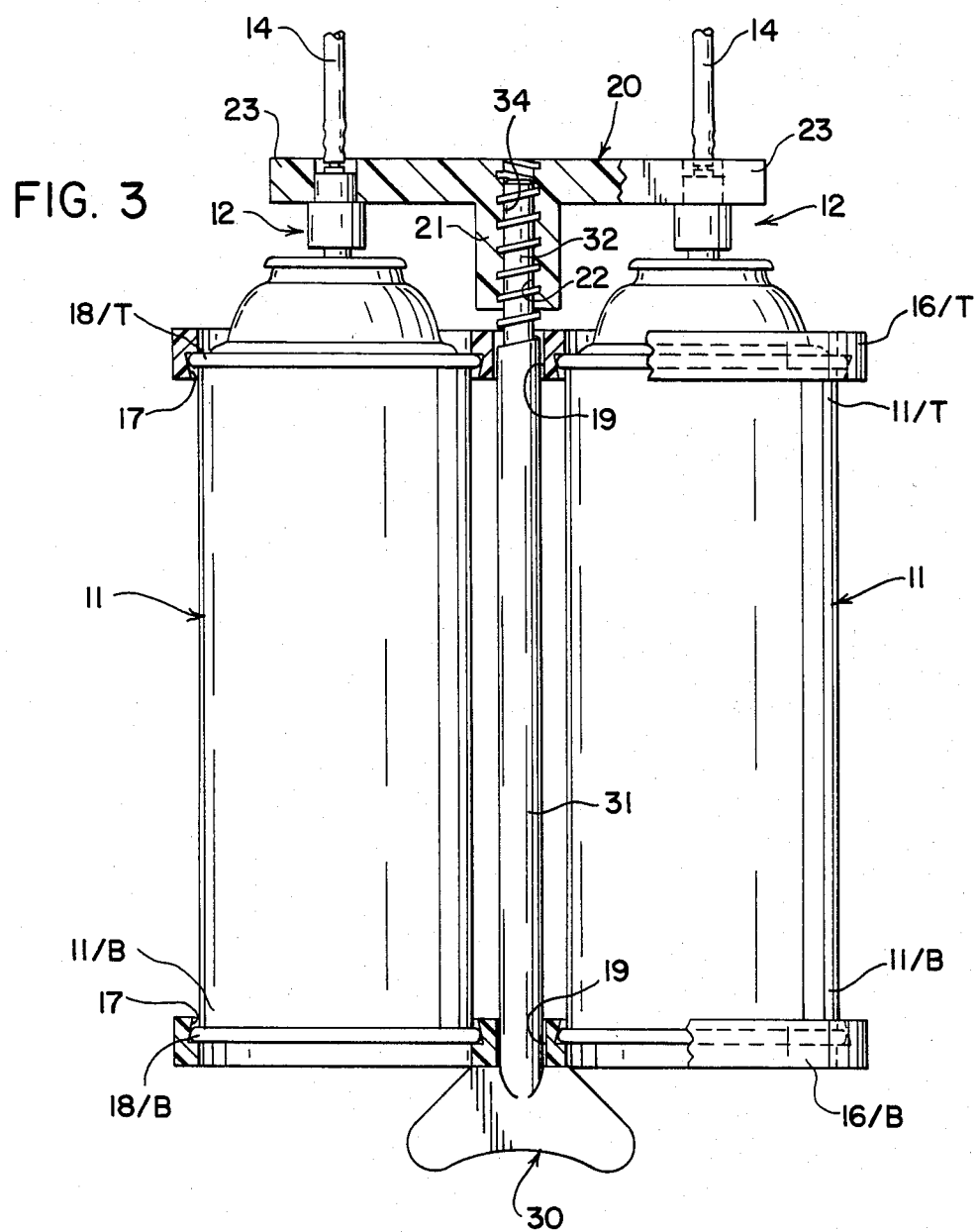
FIG. 3 is an elevation, partly in section, of a second embodiment of a dispensing apparatus according to the invention.

In the embodiment as shown in FIG. 3, the manual key 30 is positioned adjacent the bracket 16/B. The key shank thread 32 is complementary with a thread 34 in the sleeve bore 22 of T-shaped member 20.

In either embodiment, the thread sets 32-33 or 32-34 provide internal and external components of a thread means whereby manual rotation of a key 30 will move the T-shaped member 20 towards a bracket 16/T to open the container valves 12 in unison. Rotation of the key 30 in the opposite direction will close the container valves 12.

Figure 5:
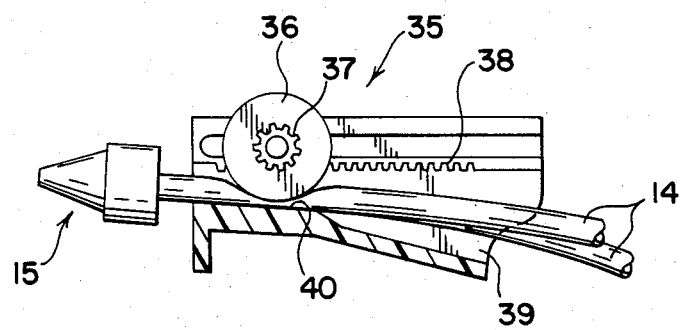
FIG. 5 is a sectional view of a known manually actuated dispensing nozzle for use with the apparatus according to the invention.

Referring to FIG. 5, a suitable manual means for controlling the flow of foam reactants through the tubing 14 to the dispensing nozzle 15, when the container valves 12 have been opened by rotation of a key 30, is referred to generally by the numeral 35. A control means 35 may have a roller 36 with pinion shafts 37 in engagement with internal racks 38. The racks 38 are formed integrally in the parallel side walls of a U-shaped housing 39. The bottom of a housing 39 has a ramped or inclined surface 40. Rotation of the roller 36 toward the nozzle 15 will impinge or clamp the tubing lengths 14 to stop the discharge of foam reactants through the nozzle 15.

What is claimed is:

1. A dispensing apparatus for multi-component foam reactants in two pressurized containers, each said container including a projecting dispensing valve in the top end thereof, comprising: two parallel brackets for holding the top end and the base end of said two containers in a side-by-side fixed position, each bracket having a medial bore therethrough; a T-shaped member having a projecting medial sleeve with a bore therethrough and laterally extending rigid side bars for engagement with said container valves; a length of flexible tubing connected to each of said container valves and extending from one of said rigid side bars to a dispensing nozzle; a manual means for controlling the flow of foam reactants through said lengths of flexible tubing when said container valves are open; a manual key having an elongated shank extending coaxially within said bracket medial bores and said T-shaped member sleeve bore; and thread means having an internal component on said key shank and an external component in one of said bores whereby manual rotation of said key will move said T-shaped member toward one of said brackets to open said container valves in unison.

2. A dispensing apparatus according to claim 1, wherein said manual key is positioned adjacent said T-shaped member and the external component of said threads means is in a medial bore of a bracket which is holding the base end of said containers.

3. A dispensing apparatus according to claim 1, wherein said manual key is positioned adjacent the bracket which is holding the base end of said containers and the external component of said thread means is in the sleeve bore of said T-shaped member.

4. A dispensing apparatus according to claim 1, wherein said T-shaped member projecting sleeve has a predetermined length so that movement thereof toward one of said brackets will be positively stopped.

* * * * *